Nov. 10, 1931.  S. G. BUSKARD  1,831,342
SPRAYING DEVICE
Filed Jan. 17, 1928   2 Sheets-Sheet 1

INVENTOR
SAMUEL G. BUSKARD
BY
Geo. T. Wheelock
ATTORNEY

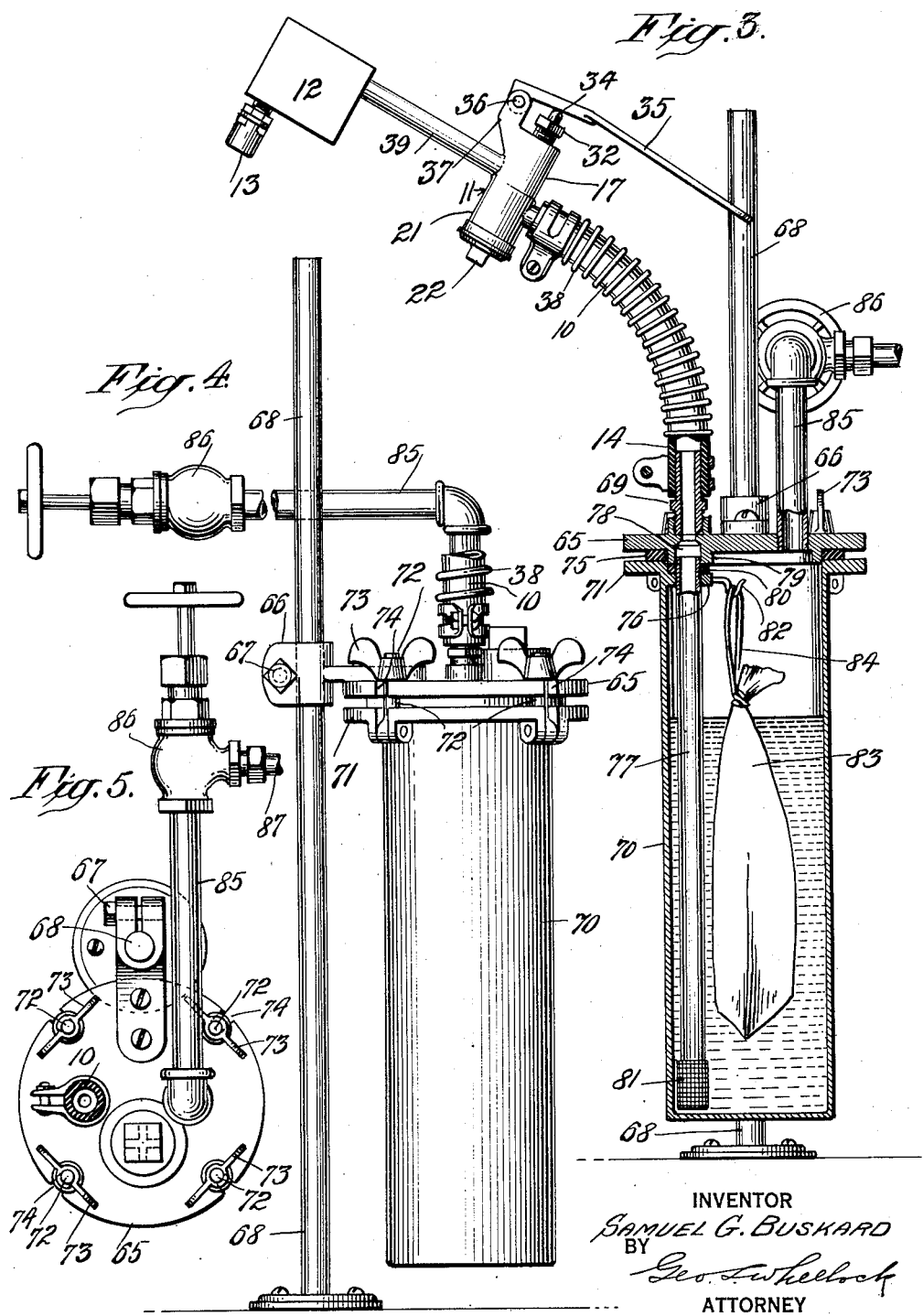

Patented Nov. 10, 1931

1,831,342

UNITED STATES PATENT OFFICE

SAMUEL G. BUSKARD, OF RICHMOND HILL, NEW YORK

SPRAYING DEVICE

Application filed January 17, 1928. Serial No. 247,335.

The present invention relates particularly to spraying devices for spraying garments to facilitate pressing the same.

One of the objects of the invention is to provide a spraying device with a valve of such character that the spray from the nozzle will instantly stop upon the closure of the valve, and from which there will be no drip after the valve is closed.

This being an object of my present invention, the same consists of certain features of construction and combinations of parts to be hereinafter described and then claimed with reference to the accompanying drawings illustrating a preferred embodiment of the invention, in which:

Fig. 3 is an enlarged elevation, partly in section, of the spraying device;

Fig. 4 is an elevation at right angles to Fig. 3, and

Fig. 5 is a top plan of the device, the movable spraying portions being omitted.

Figure 1:
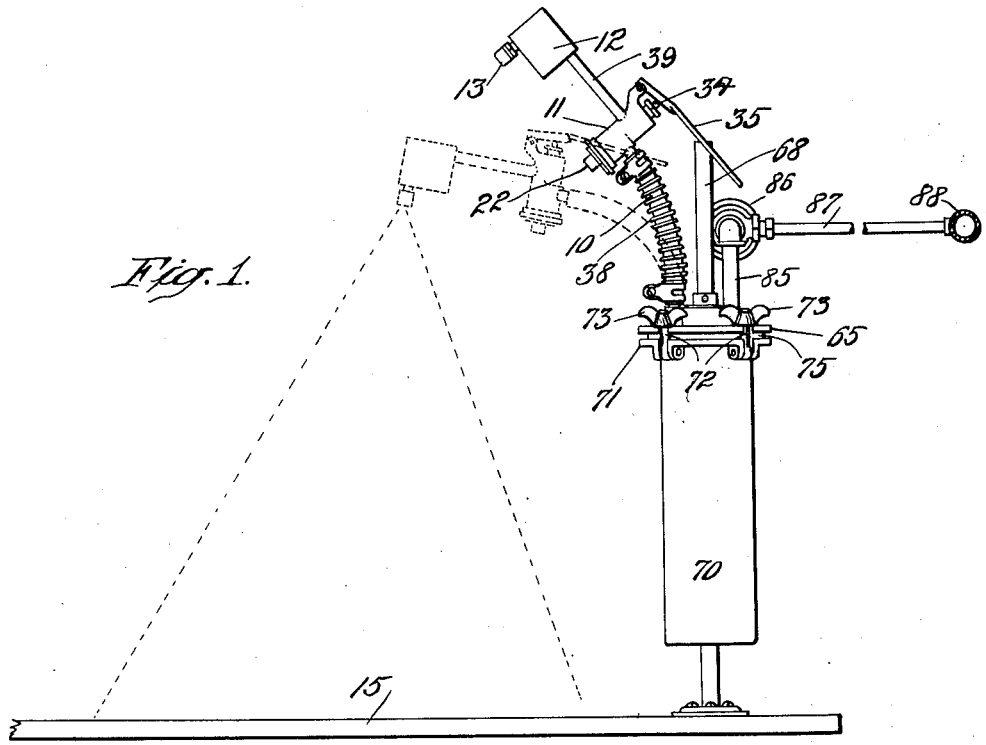
Figure 1 is a side elevation of the complete device or apparatus, showing in full lines the position for use and in dotted lines a using position.

Referring to the drawings, a flexible support or coupling 10 is connected with a manually operated valve 11, a trap member 12 and a spray nozzle 13, such elements forming a discharge conduit. The coupling 10 is connected to a liquid supply pipe 14 which, together with the other parts named, are supported adjacent the pressing table 15, upon which the garment to be sprayed is spread out.

The valve 11 comprises a body portion 17 having an annular valve seat 18 and laterally extending inlet and outlet ports 19 and 20, respectively. The lower portion 21 of the valve body is fitted with a screw-threaded closure plug 22 having a bore 23 which serves as a guide for valve stem 24. A compression spring 26 is located between the plug 22 and an annular shoulder 27 formed with the valve, for the purpose of forcing the valve against its seat 18. The valve is preferably provided with a facing disk 28 of suitable material, such as rubber, fibre, or the like, to contact with the seat 18, and said disk may be held by a screw 29. The upper portion of the valve body 17 has a threaded bore 30 in alignment with valve seat 18, and into the bore there is screwed a centrally apertured plug 31 which cooperates with a packing gland 32 to retain the packing 33.

For the purpose of operating the valve 25, a plunger 34 is guided in the members 31 and 32, the lower end of said plunger being provided with suitable means for contacting with the head of the screw 29 or other part of the valve and the upper end of said plunger extending beyond the gland 32 for engagement by a lever 35 which is pivoted at 36 to a deflected extension 37 of the valve body. By depression of the lever 35, the valve 25 is forced away from its seat 18, thereby allowing water or other fluid to pass from the inlet port 19 to the outlet port 20.

The inlet port 19 is connected to the flexible coupling 10, preferably in the form of rubber hose, such coupling being surrounded by a helical spring 38 to make it more or less resilient. Water or other spraying fluid is supplied through the conduit 14 and coupling 10 to the inlet port 19 of the valve. The water or other fluid is under pressure varying in accordance with the local working conditions. The outlet port 20 extends through a hollow stem 39 which supports the trap member 12, having a plurality of reversely disposed passages 40 connected together at their ends 41, as shown in Fig. 2, and terminating at 42 in a downward direction.

A nipple 43 is carried by trap member 12 in alignment with the passage 42, for the connection of the spraying nozzle 13, which comprises a hollow shell or cap 44 internally threaded at 45. A deflector 46 is adjustably mounted within the threaded portion of the shell 44 and is provided with one or more diagonal passages 47. The deflector 46 may have a stem 48 to facilitate its adjustment in the shell 44. The outer wall 49 of the shell 44 is relatively thin and preferably tapers towards it center where a small spray orifice 50 is formed, the material at the edge of the orifice being at practically a knife edge. The preferred construction of discharge nozzle and concomitant parts produces a fine spray as it issues from the orifice 50.

Figure 2:
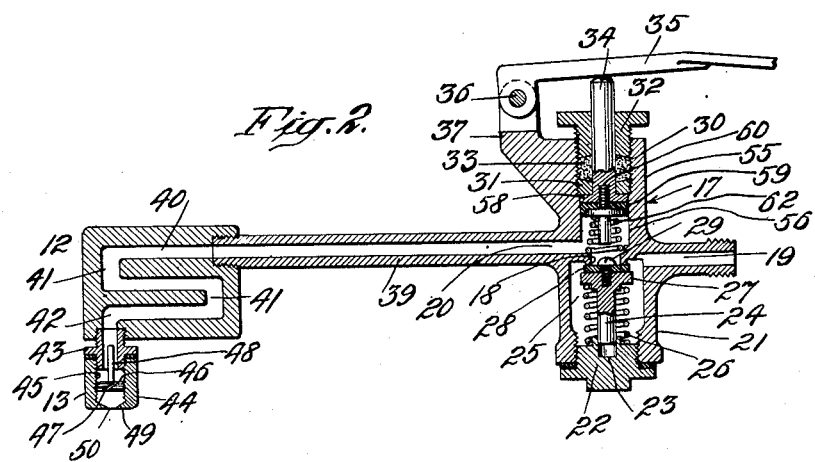
Fig. 2 is an enlarged sectional view of the manually operable and movable spraying means.

The preferred construction of fluid control valve and concomitant parts is fully shown in Fig. 2. Such valve is especially adapted to prevent liquid dripping from the nozzle 13 after the valve 25 has been closed. The threaded bore for the gland 32 and member 31 extends from the upper end of the upper portion 55 of the valve body and terminates at a considerable distance above the valve seat. From that point down to the intersection with the outlet port 20, the valve body 17 has a smooth bore 56. The plunger 34 is provided at its inner end with a flange 58 against which is seated a cup washer 59 of rubber, fibre or other suitable packing material, which is adapted to snugly fit, with a certain degree of sliding movement, within the smooth bore 56. The washer 59 may be secured to the plunger 34 by means of a threaded stem 60, said stem having an extension 61 which is adapted to engage the valve member 29 for the purpose of opening the valve, but the extremity of said extension 61 is normally spaced from the valve member 29 when the parts are in closed position, as illustrated in Fig. 2. It will be apparent that the plunger 34, cup washer 59 and extension 61 are capable of relative movement with respect to the valve 25, and in order to accomplish its purpose the cup washer and concomitant parts are normally forced away from the valve seat by means of a compression spring 62 which suitably is seated, as shown.

When the lever 35 is actuated to depress the plunger 34, said plunger and the parts attached thereto move toward the valve seat 18 until the extremity of the extension 61 comes in contact with the abutment member 29 of the valve, and thereafter further movement of the lever in the same direction opens the valve 25 to permit passage of the spraying fluid into the outlet port 20. When the lever 35 is again released, the movable parts return to their normal position, and in view of the fact that the end of the extension 61 is spaced from the abutment member 29 it will be obvious that the cup washer 59 and plunger 34 continue to move away from the valve seat 18 after the valve has closed. Such independent movement of the cup washer (it could be termed a sucker) creates a suction at the outer side of the valve tending to draw the fluid inwardly from the nozzle 13 and the trap 12, and in such manner dripping from the nozzle is prevented. The suction so produced cannot easily be overcome, because of the presence of the trap 12 and the restricted portions at the nozzle, and therefore said suction will be effective until the next time that the valve is actuated.

It may be necessary to vary the suction effect of the cup washer 59 in accordance with the particular requirements of individual spraying units, and such adjustment may be made by turning the plug 31 to raise or lower the same. Under some conditions the packing gland 32 and packing 33 may be omitted from the valve, since leakage of the fluid beyond the plunger is practically eliminated by the cup washer. The desirability of such packing is of course dependent upon the pressure of the fluid or of the nature of the fluid which is being sprayed.

Referring more particularly to Figs. 3 and 4, the preferred means for supplying a chemical mixture for the spray will now be described. A head or plate 65 of preferably circular shape is provided, it having attached thereto a split clamping member or slide clamp 66. The clamping member 66 is provided with fastening means 67 for the purpose of adjustably securing the head 65 upon a supporting standard 68 which may be rigidly mounted upon the pressing table 15. A hollow metallic coupling member 69 is screwed into the head 65 and on the outer end thereof the conduit 14 is tightly secured.

A reservoir 70 is provided, preferably of cylindrical shape, for containing the fluid or liquid to be sprayed, and at its upper end it is provided with an annular flange 71, preferably of the same diameter as the head 65. Swinging bolts 72 are pivoted upon the upper end of the reservoir 70 and the outer ends thereof are screw threaded for receiving thumb-nuts 73, so that the reservoir may be mounted upon or disconnected from the head 65, by swinging the bolts into or out of peripheral notches 74 in the head 65. When the nuts are tightened up, the reservoir will be rigidly supported upon the head 65, and to make an air-tight joint a rubber or other suitable gasket 75 is introduced between the head 65 and the flange 71. If the reservoir is to contain liquid or if it is to be cleaned or the like, it is a very simple matter to loosen the nuts 73, swing out the bolts 72 and remove the reservoir.

The reservoir 70 is provided at its upper end with an inwardly projecting lug 76 which is apertured so that a depending tubular leg 77 may be screwed therein and supported by the lug. The head 65 is provided with a hole 78 extending through a boss or enlargement 79 and communicating with the end 69 of the discharge conduit, the upper end of the dependent tube 77 projecting above the lug 76 so that it may be readily slipped into and out of engagement with the boss 79. At this point a packing washer 80 may be provided so as to make a tight joint at the connection where the tube 77 enters the hole 78. The lower end of the dependent tube 77 is provided with a strainer 81 preferably composed of a wire screen of fine mesh for straining out dirt and foreign matter which might otherwise enter the tube 77.

Within the upper end of the reservoir there is provided a supporting hook 82 which projects from the lug 76, which hook is adapted to support a porous bag 83 by means of a suspending loop 84 which engages over said hook. The porous bag 83 may be formed of fine mesh cotton cheese cloth for the purpose of confining in the bag the particular chemical which it may be desired to use at a given time, such, for example, as alum, starch, bluing, etc. The loop 84 is formed by a string with which the mouth of the bag is tied to confine the contents, and by said loop, the bag 83 is suspended within the reservoir, and if the reservoir contains liquid, the bag is suspended within the liquid. When the reservoir contains liquid it is obvious that same will saturate the bag and that the chemical in the bag will mix with the liquid gradually, and a fresh supply of liquid being placed in the reservoir as needed.

From the head 65 extends a pipe 85 which is provided with a control valve 86 which controls air pressure from a pipe 87 connected with a pressure main 88, the object being to impose desirable pressure upon the liquid in the reservoir so as to force the same through the conduits of the spraying device and out of the spraying nozzle.

The foregoing description and the drawings will enable those skilled in the art to construct the entire apparatus, and it will be obvious that certain changes and modifications may be made therein without departing from the spirit of the invention and the scope of the appended claims.

What I claim as new, is:

1. In a device of the character described, the combination with a fluid supply conduit and a spray nozzle, of a controlling valve between the conduit and nozzle, and located to one side of the passage through them, and means at the opposite side of the passage to create a suction in the nozzle when the valve is closed.

2. In a device of the character described, the combination with a fluid supply conduit and a spray nozzle, of a valve seat between the conduit and nozzle, and located to one side of the passage through them a valve in the conduit and cooperating with the seat, and means at the opposite side of the passage to open the valve and to create a suction in the nozzle when the valve is closed.

3. A controlling valve for a spraying device, having a valve seat, a valve member operable toward and away from said seat at the inlet side, a reciprocable stem disconnected from and for operating the valve member from the outlet side, a spring for withdrawing the stem from contact with the valve, and means carried by the stem for creating a suction at the outer side of the valve seat as the valve is closed.

SAMUEL G. BUSKARD.